(12) United States Patent
Zhou et al.

(10) Patent No.: US 11,900,877 B2
(45) Date of Patent: Feb. 13, 2024

(54) ORGANIC LIGHT-EMITTING DIODE CONTROL CIRCUIT AND DISPLAY PANEL

(71) Applicant: HKC CORPORATION LIMITED, Shenzhen (CN)

(72) Inventors: Renjie Zhou, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/068,396

(22) Filed: Dec. 19, 2022

(65) Prior Publication Data

US 2023/0410739 A1  Dec. 21, 2023

(30) Foreign Application Priority Data

May 23, 2022 (CN) ............... 202210565457.1

(51) Int. Cl.
*G09G 3/3233* (2016.01)

(52) U.S. Cl.
CPC ... *G09G 3/3233* (2013.01); *G09G 2300/0408* (2013.01); *G09G 2300/0814* (2013.01); *G09G 2300/0819* (2013.01); *G09G 2310/0202* (2013.01); *G09G 2310/0291* (2013.01); *G09G 2330/027* (2013.01); *G09G 2330/028* (2013.01)

(58) Field of Classification Search
CPC ............... G09G 3/3233; G09G 3/3258; G09G 2300/0814; G09G 2300/0819; G09G 2310/0291; G09G 2330/027; G09G 2330/028
See application file for complete search history.

(56) References Cited

U.S. PATENT DOCUMENTS

| | | | |
|---|---|---|---|
| 2015/0221249 A1 | 8/2015 | Kim et al. | |
| 2017/0140724 A1* | 5/2017 | Lin | .............. G09G 3/3233 |
| 2021/0383763 A1* | 12/2021 | Kim | .............. H10K 59/131 |

FOREIGN PATENT DOCUMENTS

| | | |
|---|---|---|
| CN | 201716965 U | 1/2011 |
| CN | 108630136 A | 10/2018 |
| CN | 110689840 A | 1/2020 |
| CN | 111243521 A | 6/2020 |
| CN | 114283734 A | 4/2022 |
| CN | 114446224 A | 5/2022 |
| CN | 114783381 A | 7/2022 |
| JP | 2007328351 A | 12/2007 |
| KR | 20110071429 A | 6/2011 |

* cited by examiner

*Primary Examiner* — Dennis P Joseph
(74) *Attorney, Agent, or Firm* — Hodgson Russ LLP

(57) ABSTRACT

An organic light-emitting diode control circuit includes an organic light-emitting diode, an input control module and a protection module. The input control module is enabled in response to a scan signal provided by the scan line, and controls an operation of the organic light-emitting diode based on a data signal provided by the data line. The protection module can detect the current passing through the organic light-emitting diode or voltage across the same, and control the input control module to cut off the power supply of the organic light-emitting diode when the current of the organic light-emitting diode or the voltage across the same is greater than a preset value.

16 Claims, 2 Drawing Sheets

ORGANIC LIGHT-EMITTING DIODE CONTROL CIRCUIT AND DISPLAY PANEL

CROSS-REFERENCE TO RELATED APPLICATION

This application claims priority to Chinese Patent Application No. 202210565457.1, filed May 23, 2022, the entire disclosure of which is incorporated herein by reference.

FIELD OF TECHNOLOGY

The present application relates to the display field, more particularly, to an organic light-emitting diode control circuit and a display panel.

BACKGROUND

Organic light-emitting diode (OLED) display panel has been widely used in the field of high-performance display because of its high density, wide viewing angle, fast response speed and low power consumption. Organic light-emitting diodes (OLEDs) are driven by current, but in the prior art, they are not protected when driven by current, and excessive drive current may lead to damage of OLEDs.

SUMMARY

There are provided an organic light-emitting diode control circuit and a display panel according to embodiments of the present application. The technical solution is as below:

According to a first aspect of the present application, there is provided an organic light-emitting diode control circuit including an organic light-emitting diode, and the organic light-emitting diode control circuit further includes:
  an input control module connected to a scan line, a data line and the organic light-emitting diode, the input control module being enabled in response to a scan signal provided by the scan line, the input control module controlling an operation of the organic light-emitting diode based on a data signal provided by the data line; and
  a protection module connected to the organic light-emitting diode and the input control module, the protection module being able to detect a current passing through the organic light-emitting diode or a voltage across the organic light-emitting diode, and controlling the input control module to cut off power supply of the organic light-emitting diode when the current of the organic light-emitting diode or the voltage across the organic light-emitting diode is greater than a preset value.

According to a second aspect of the present application, there is provided a display panel, which includes:
  a base substrate; and
  the above organic light-emitting diode control circuit formed on the base substrate.

It should be understood that the above general description and the following detailed description are exemplary and explanatory only and are not intended to limit the present disclosure.

BRIEF DESCRIPTION OF THE DRAWINGS

The accompanying drawings, which are incorporated in and constitute a part of the description, illustrate embodiments consistent with the present application and, together with the description, serve to explain the principles of the present application. Obviously, the drawings in the following description are merely some embodiments of the present application, from which other drawings may be obtained without exerting inventive effort by those ordinarily skilled in the art.

DETAILED DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art.

Further, the described features, structures or characteristics may be incorporated in any suitable manner in one or more embodiments. In the following description many specific details are provided to give a full understanding of the embodiments of the present application. However, those skilled in the art will appreciate that the technical aspects of the present application may be practiced without one or more of the specific details, or other methods, components, devices, steps and the like may be employed. In other instances, the common methods, device, implementations or operations are not shown or described in detail to avoid obscuring aspects of the present application.

The present application is further described below with reference to the accompanying drawings and specific embodiments. It should be noted that the technical features involved in the different embodiments of the present application described below can be combined mutually in case of no conflict. The following embodiments described with reference to the drawings are illustrative and only used to explain the present application, but may not be interpreted as the restrictions of the present application.

Embodiment 1

Figure 1:
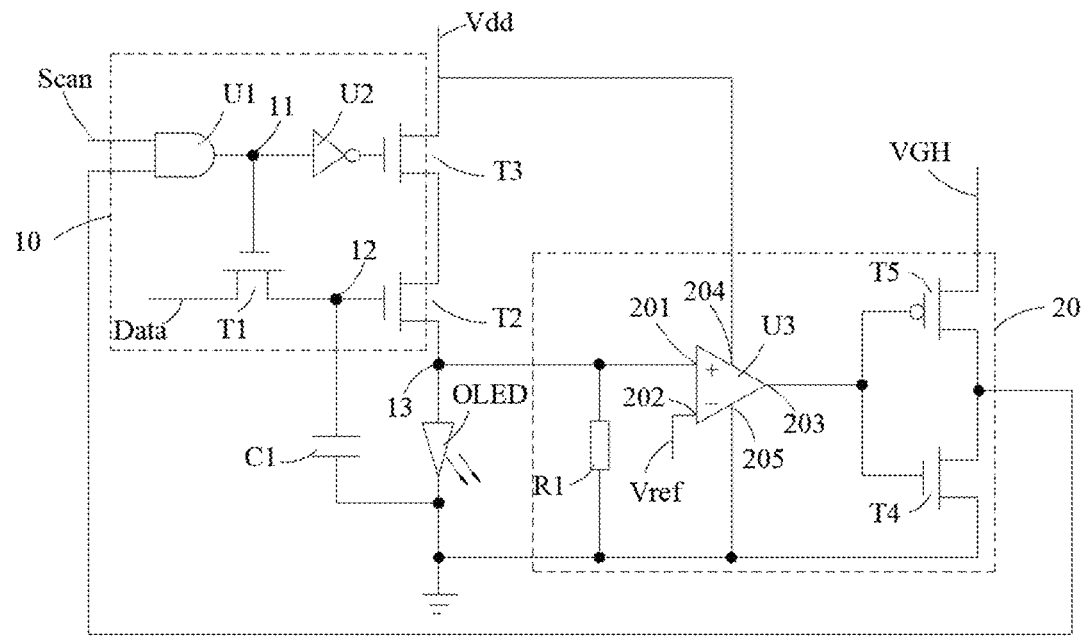
FIG. 1 is a schematic diagram of an organic light-emitting diode control circuit in embodiment 1 of the present application.

Referring to FIG. 1, the organic light-emitting diode control circuit includes an organic light-emitting diode OLED, an input control module 10 and a protection module 20. The input control module 10 is connected to a scan line Scan, a data line Data and the organic light-emitting diode OLED. The input control module 10 is enabled in response to the scan signal provided by the scan line Scan. The input control module 10 controls the operation of the organic light-emitting diode OLED based on the data signal provided by the data line Data. The protection module 20 is connected to the organic light-emitting diode OLED and the input control module 10. The protection module 20 can detect the voltage across the organic light-emitting diode OLED. When the voltage across the organic light-emitting diode OLED is greater than a preset voltage, the input control module 10 is controlled to cut off the power supply of the organic light-emitting diode OLED.

It should be noted that the protection module 20 may be provided to detect the voltage across the organic light-emitting diode OLED, but is not limited thereto, and the protection module 20 may be provided to detect a current passing through the organic light-emitting diode OLED, as the case may be. When the protection module 20 is provided to detect the current passing through the organic light-emitting diode OLED, and the current of the organic light-emitting diode OLED is greater than a preset current, the input control module 10 is controlled to cut off the power supply of the organic light-emitting diode OLED.

In this embodiment, the protection module 20 is connected to the organic light-emitting diode OLED and the input control module 10, the protection module 20 can detect the voltage across the organic light-emitting diode OLED, when the voltage across the organic light-emitting diode OLED is larger than the preset voltage, i.e., when the drive current of the organic light-emitting diode OLED is excessive, the input control module 10 receives the control signal fed back by the protection module 20 and then cuts off the power supply of the organic light-emitting diode OLED, thus avoiding the damage of the organic light-emitting diode OLED caused by excessive drive current.

For example, the input control module 10 includes a first transistor T1, a second transistor T2 and a third transistor T3. A control terminal of the first transistor T1 is connected to the scan line Scan, a first terminal of the first transistor T1 is connected to the data line Data, and a second terminal of the first transistor T1 is connected to the control terminal of the second transistor T2. A first terminal of the second transistor T2 is connected to a second terminal of the third transistor T3, a second terminal of the second transistor T2 is connected to a first pole of the organic light-emitting diode OLED, and a second pole of the organic light-emitting diode OLED can be grounded. A control terminal of the third transistor T3 is connected to the protection module 20, and a first terminal of the third transistor T3 is connected to a first power supply whose voltage is a first voltage Vdd. The protection module 20 controls the third transistor T3 to cut off the power supply of the organic light-emitting diode OLED.

It should be noted that, the protection module 20 may be connected to the control terminal of the third transistor T3 to control the third transistor T3 to cut off the power supply of the organic light-emitting diode OLED, but is not limited thereto. The protection module 20 may also be connected to the control terminal of the first transistor T1 to indirectly control the second transistor T2 to cut off the power supply of the organic light-emitting diode OLED by controlling the first transistor T1, as the case may be.

The scan line Scan is connected to the control terminal of the first transistor T1, and both of the scan line Scan and the first transistor T1 may be directly connected, but are not limited thereto. The scan line Scan and the first transistor T1 may also be indirectly connected through other circuits, as the case may be. Accordingly, the protection module 20 is connected to the control terminal of the third transistor T3, and the protection module 20 and the third transistor T3 may be directly connected, but not limited thereto, and may also be indirectly connected, as the case may be.

The first transistor T1, the second transistor T2, and the third transistor T3 may all be N-type metal oxide semiconductor field effect transistors (i.e., NMOS), but are not limited thereto, and the first transistor T1, the second transistor T2, and the third transistor T3 may also be partially or fully P-type metal oxide semiconductor field effect transistors (i.e., PMOS), as the case may be. When the first transistor T1, the second transistor T2 and the third transistor T3 are all N-type metal oxide semiconductor field effect transistors, the control terminals thereof are gate electrodes of the N-type metal oxide semiconductor field effect transistors, the first terminals thereof are the drain electrodes of the N-type metal oxide semiconductor field effect transistors, and the second terminals thereof are the source electrodes of the N-type metal oxide semiconductor field effect transistors. The first pole of the organic light-emitting diode OLED may be an anode, and the second pole of the organic light-emitting diode OLED may be a cathode.

The protection module 20 is connected to the second transistor T2 or the third transistor T3. When the protection module 20 detects that the voltage across the organic light-emitting diode OLED is greater than the preset voltage, a control signal is fed back to the second transistor T2 or the third transistor T3 to cut off the power supply of the organic light-emitting diode OLED, thereby avoiding the damage of the organic light-emitting diode OLED caused by excessive drive current. The input control module 10 includes the first transistor T1, the second transistor T2, and the third transistor T3, and the structure of the control circuit is simplified.

Referring to FIG. 1, the organic light-emitting diode control circuit further includes a precharge capacitor C1, the first terminal of the first transistor T1 and the control terminal of the second transistor T2 are connected through a second node 12, the precharge capacitor C1 is connected to the second node 12 and the second pole of the organic light-emitting diode OLED.

The equivalent circuit of organic light-emitting diode OLED is a parallel light-emitting diode and a parasitic capacitor, which will operate only when the voltage across the light-emitting diode reaches the turn-on voltage. Because of the existence of parasitic capacitor, the power supply needs to charge the parasitic capacitor first, resulting in the operation delay of organic light-emitting diode OLED. In the present application, the organic light-emitting diode control circuit also includes a precharge capacitor C1 connected to the second node 12 and the second pole of the organic light-emitting diode OLED. The precharge capacitor C1 is charged before the organic light-emitting diode OLED works, and the voltage charged to the precharge capacitor C1 is lower than the turn-on voltage of the second transistor T2. When the data signal arrives, the voltage of the precharge capacitor C1 increases to turn on the second transistor T2, the organic light-emitting diode OLED lights up quickly, thus shortening the operation delay of the organic light-emitting diode OLED.

Referring to FIG. 1, the input control module 10 also includes an AND gate U1 and a first NOT gate U2. The AND gate circuit U1 includes a first input terminal, a second input terminal and an output terminal. The first input terminal of the AND gate circuit U1 is connected to a scan line Scan, the second input terminal of the AND gate circuit U1 is connected to the protection module 20, the output terminal of the AND gate circuit U1 is connected to the control terminal of the first transistor T1 through the first node 11, and the first NOT gate circuit U2 is connected to the control terminal of the first node 11 and the third transistor T3. The first NOT gate circuit U2 includes an inverter.

When one of the first input terminal and the second input terminal of the AND gate circuit U1 outputs a low-level signal, the output terminal of the AND gate circuit U1 outputs the low-level signal. When both the first input terminal and the second input terminal of the AND gate circuit U1 inputs a high-level signal, the output terminal of the AND gate circuit U1 outputs the high-level signal. When the input terminal of the first NOT gate circuit U2 inputs the low-level signal, the output terminal of the first NOT gate circuit U2 outputs the high-level signal, and when the input terminal of the first NOT gate circuit U2 outputs the high-level signal, the output terminal of the first NOT gate circuit U2 outputs the low-level signal. The protection module 20 controls the second transistor T2 to cut off the power supply of the organic light-emitting diode OLED by controlling the AND gate circuit U1 to output a low-level signal.

The input control module 10 includes the AND gate circuit U1, the first terminal of the AND gate circuit U1 is connected to the scan line Scan, and the second terminal of the AND gate circuit U1 is connected to the protection module 20. When the protection module 20 detects that a voltage across the organic light-emitting diode OLED is greater than a preset voltage, it feeds back a control signal to the AND gate circuit U1. The control signal fed back by the protection module 20 is the low level signal. Therefore, no matter whether the scan line Scan inputs the low-level signal or the high-level signal, the AND gate circuit U1 outputs the low-level signal, the first transistor T1 is turned off, and the second transistor T2 indirectly controlled by the AND gate circuit U1 through the first transistor T1 is also turned off, thereby cutting off the power supply of the organic light-emitting diode OLED and avoiding the damage of the organic light-emitting diode OLED caused by excessive drive current. In addition, a single organic light-emitting diode OLED is only controlled by one scan signal, which reduces a general layout of scan line Scan, and effectively avoids the race and hazard phenomenon without other control signals.

Referring to FIG. 1, the protection module 20 includes a comparison unit U3 and a second NOT gate circuit. The comparison unit U3 includes a non-inverting input terminal 201, an inverting input terminal 202, an output terminal 203, a positive power input terminal 204, and a negative power input terminal 205. The first terminal of the second transistor T2 and the first pole of the organic light-emitting diode OLED are connected through a third node 13. The non-inverting input terminal 201 of the comparison unit U3 is connected to the third node 13, and the inverting input terminal 202 of the comparison unit U3 is connected to a second power supply whose voltage is a second voltage Vref. The positive power input terminal 204 of the comparison unit U3 is connected to the first power supply, i.e., the voltage of the positive power input terminal 204 of the comparison unit U3 is the first voltage Vdd. The negative power supply input terminal 205 of the comparison unit U3 is connected to the second pole of the organic light-emitting diode OLED, and the second NOT gate circuit is connected to the output terminal 203 of the comparison unit U3 and the second input terminal of the AND gate circuit U1.

The second voltage Vref is the preset voltage mentioned above. When the voltage of the first pole of the organic light-emitting diode OLED is greater than the second voltage Vref. The output terminal 203 of the comparison unit U3 outputs a high-level signal, the second NOT gate circuit outputs a low-level signal. Therefore, no matter whether the scan line Scan inputs a low-level signal or a high-level signal, the AND gate circuit U1 outputs the low-level signal, the first transistor T1 is turned off, and the second transistor T2 indirectly controlled by the AND gate circuit U1 through the first transistor T1 is also turned off, thereby cutting off the power supply of the organic light-emitting diode OLED and avoiding the damage of the organic light-emitting diode OLED caused by excessive drive current.

Referring to FIG. 1, the comparison unit U3 may be a voltage comparator including a non-inverting input terminal, an inverting input terminal, an output terminal, a positive power supply input terminal and a negative power supply input terminal.

It should be noted that the comparison unit U3 may be a voltage comparator, but is not limited thereto, and the comparison unit U3 may also be an operational amplifier or other voltage comparison circuit, as the case may be.

The comparison unit U3 is a voltage comparator, the voltage of the first pole of the organic light-emitting diode OLED is slightly higher than the second voltage Vref, and a voltage of the output terminal of the comparison unit U3 is close to the first voltage Vdd, which can ensure that the AND gate circuit U1 can receive a low-level signal.

Referring to FIG. 1, the organic light-emitting diode control circuit further includes a resistor R1. The resistor R1 is connected to the second pole of the organic light-emitting diode OLED and the third node 13.

When the voltage of the first pole of the organic light-emitting diode OLED is greater than the second voltage Vref, the output terminal of the comparison unit U3 outputs a high-level signal, and the resistor R1 can stabilize the voltage of the first pole of the organic light-emitting diode OLED to ensure the accuracy of the comparison result of the comparison unit U3.

Referring to FIG. 1, the second NOT gate circuit includes a complementary metal oxide semiconductor device (i.e., CMOS). The complementary metal oxide semiconductor device includes an input terminal, an output terminal, a positive power supply terminal and a negative power supply terminal. The input terminal of the complementary metal oxide semiconductor device is connected to the output terminal of the comparison unit U3. The output terminal of the complementary metal oxide semiconductor device is connected to the second input terminal of the AND gate circuit U1. The negative power supply terminal of the complementary metal oxide semiconductor device is connected to the second pole of the organic light-emitting diode OLED, the positive power supply terminal of the complementary metal oxide semiconductor device is connected to a third power supply, the voltage of the third power supply is a third voltage VGH, and the voltage at the time that the scan line Scan outputs the high-level signal is the third voltage VGH.

The complementary metal oxide semiconductor device includes a fourth transistor T4 and a fifth transistor T5. The fourth transistor T4 is an N-type metal oxide semiconductor field effect transistor, and the fifth transistor T5 is a P-type metal oxide semiconductor field effect transistor.

The control terminals (i.e., gates) of the fourth transistor T4 and the fifth transistor T5 are connected as input terminals of the complementary metal oxide semiconductor device. First terminals (i.e., drains) of the fourth transistor T4 and the fifth transistor T5 are connected as output terminals of the complementary metal oxide semiconductor device. A second terminal (i.e., source) of the fifth transistor T5 serves as a positive power supply terminal of the complementary metal oxide semiconductor device, and a second terminal of the fourth transistor T4 serves as a negative power supply terminal of the complementary metal oxide semiconductor device.

The second NOT gate circuit includes a complementary metal oxide semiconductor device, which has low static power consumption and can reduce power consumption of the display panel.

When the organic light-emitting diode control circuit works normally:

in a first stage: when the scan signal does not arrive or the scan signal is a low-level signal, the AND gate circuit U1 receives the low-level signal, the AND gate circuit U1 outputs the low-level signal, the first transistor T1 and the second transistor T2 are turned off, the first NOT gate circuit U2 receives the low-level signal, the first NOT gate circuit U2 outputs a high-level signal, the third transistor T3 is turned on, the voltage at the non-inverting input terminal voltage of the comparison unit U3 is less than the second voltage Vref, the comparison unit U3 outputs a low-level signal, the complementary metal oxide semiconductor device receives the low-level signal, and outputs a high-level signal;

in a second stage: when the scan signal is a high-level signal, both input terminals of the AND gate circuit U1 receive the high-level signal, the AND gate circuit U1 outputs the high-level signal, the second transistor T2 and the third transistor T3 are turned off, the first transistor T1 is turned on, and the data signal enables the precharge capacitor C1 to be charged; and in a third stage: when the scan signal is a low-level signal, the first transistor T1 is cut off, the third transistor T3 is turned on, the voltage of the precharge capacitor C1 enables the second transistor T2 to be turned on, the first power supply and the organic light-emitting diode OLED are turned on, and the organic light-emitting diode OLED is lit.

In the operation of the organic light-emitting diode control circuit, if the drive current of organic light-emitting diode OLED is too large, the resistor R1 detects that the voltage at the first pole of the organic light-emitting diode OLED is greater than the second voltage Vref, the comparison unit U3 outputs a high-level signal, the complementary metal oxide semiconductor device outputs a low-level signal, the second input terminal of the AND gate circuit U1 receives the low-level signal, regardless of whether the scan signal is the high-level signal or the low-level signal, the AND gate circuit U1 outputs the low-level signal, the first transistor T1 is cut off, the data signal fails to enable the precharge capacitor C1 to be charged, the second transistor T2 is cut off, and the power supply of the organic light-emitting diode OLED is cut off, that is, the first power supply is cut off.

If the drive current of the organic light-emitting diode OLED is reduced to the normal working current of the organic light-emitting diode OLED, the resistor R1 detects that the voltage at the first pole of the organic light-emitting diode OLED is less than the second voltage Vref, the comparison unit U3 outputs a low-level signal, the complementary metal oxide semiconductor device outputs a high-level signal, and the second input terminal of the AND gate circuit U1 receives the high-level signal. At this time, the output signal of the AND gate circuit U1 is determined by the scan signal, and the organic light-emitting diode control circuit resumes normal operation.

Embodiment 2

Figure 2:
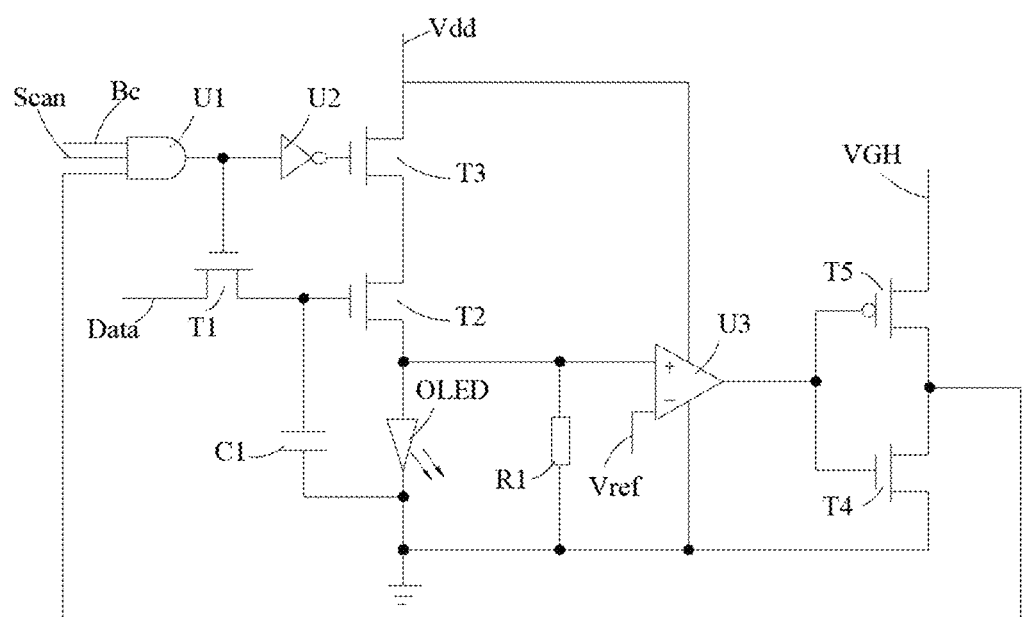
FIG. 2 is a schematic diagram of an organic light-emitting diode control circuit in embodiment 2 of the present application.

Referring to FIG. 2, the difference between Embodiment 2 and Embodiment 1 is that the AND gate circuit U1 in Embodiment 2 further includes a third input terminal. A control line Bc for outputting a low-level signal is connected to the third input terminal of the AND gate circuit U1.

A control line Bc is connected to the third input terminal of the gate circuit U1, when the control line Bc outputs a low-level signal, regardless of whether the output signal of the scan line Scan and the feedback signal of the protection module 20 are low-level signals or high-level signals, the AND gate circuit U1 outputs the low-level signal, the first transistor T1 is turned off, and the second transistor T2 indirectly controlled by the AND gate circuit U1 through the first transistor T1 is also turned off, thereby cutting off the power supply of the organic light-emitting diode OLED, the organic light-emitting diode OLED does not emit light, and the control line Bc is added to conveniently control the display panel to display a black picture locally or integrally.

Embodiment 3

Figure 3:
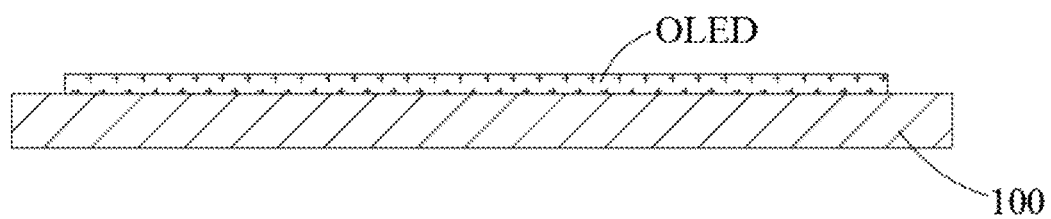
FIG. 3 is a schematic structural diagram of a display panel in embodiment 3 of the present application.

Referring to FIG. 3, the display panel includes a base substrate 100 and an organic light-emitting diode control circuit. The organic light-emitting diode control circuit includes an organic light-emitting diode OLED, an input control module 10, and a protection module 20, all of the organic light-emitting diode OLED, the input control module 10, and the protection module 20 are formed on the base substrate 100. The input control module 10 is connected to the scan line Scan, the data line Data and the organic light-emitting diode OLED. The input control module 10 is enabled in response to the scan signal provided by the scan line Scan. The input control module 10 controls the operation of the organic light-emitting diode OLED based on the data signal provided by the data line Data. The protection module 20 is connected to the organic light-emitting diode OLED and the input control module 10. The protection module 20 can detect the voltage across the organic light-emitting diode OLED. When the voltage across the organic light-emitting diode OLED is greater than a preset voltage, the input control module 10 is controlled to cut off the power supply of the organic light-emitting diode OLED. The base substrate 100 includes a glass substrate.

It should be noted that the input control module 10 and the protection module 20 may be formed on the base substrate 100, but are not limited thereto, and the input control module 10 and the protection module 20 may also be provided separately from the base substrate 100, as the case may be. The base substrate 100 includes but is not limited to a glass substrate. The base substrate 100 may also include a polyimide (i.e., Pi) substrate.

In this embodiment, the display panel includes a base substrate 100 and an organic light-emitting diode control circuit. The organic light-emitting diode control circuit includes an organic light-emitting diode OLED, an input control module 10 and a protection module 20. The protection module 20 is connected to the organic light-emitting diode OLED and the input control module 10. The protection module 20 can detect the voltage across the organic light-emitting diode OLED, when the voltage across the organic light-emitting diode OLED is larger than the preset voltage, i.e., when the drive current of the organic light-emitting diode OLED is excessive, the input control module 10 receives the control signal fed back by the protection module 20 and then cuts off the power supply of the organic light-emitting diode OLED, thus avoiding the damage of the organic light-emitting diode OLED caused by excessive drive current.

The terms of "first", "second" and the like are for descriptive purposes only and cannot be construed as indicating or implying relative importance or implying the number of the indicated technical features. Thus, features defined with "first", "second" and the like may explicitly or implicitly include one or more of the features. In the description of the present application, "multiple" means two or more unless otherwise expressly specified.

In the present application, the terms "install", "connect" and the like are to be understood in a broad sense, unless otherwise expressly specified and limited, for example, it can be a fixed connection, may also be a detachable connection, or be integral; it can be a mechanical connection, can also be an electrical connection; it can be directly connection or indirectly connection through an intermediate medium, or it can be an internal connection of two elements or an interactive relationship of two elements. For those ordinarily skilled in the art, the specific meanings of the above terms in the present application will be understood according to the specific circumstances.

In the content of the description, illustrations of the reference terms "some embodiments," "example," etc. mean that specific features, structures, materials, or characteristics described in connection with the embodiment or example are encompassed in at least one embodiment or example of the present application. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may connect and combine different embodiments or examples described in this description and features of different embodiments or examples.

Although embodiments of the present application have been shown and described above, it will be understood that the above-mentioned embodiments are exemplary and cannot be construed as limiting the present application. Those of ordinary skill in the art may make changes, variations, alternatives and modifications to the above-mentioned embodiments within the scope of the present application. Therefore, any changes or modifications made in accordance with the claims and descriptions of the present application should fall within the scope of the patent of the present application.

What is claimed is:

1. An organic light-emitting diode control circuit, comprising:
    an organic light-emitting diode;
    an input control module connected to a scan line, a data line and the organic light-emitting diode, wherein the input control module is enabled in response to a scan signal provided by the scan line, and the input control module controls an operation of the organic light-emitting diode based on a data signal provided by the data line; and
    a protection module connected to the organic light-emitting diode and the input control module, wherein the protection module is able to detect a current passing through the organic light-emitting diode or a voltage across the organic light-emitting diode, and controls the input control module to cut off power supply of the organic light-emitting diode when the current of the organic light-emitting diode or the voltage across the organic light-emitting diode is greater than a preset value;
    wherein the input control module comprises:
        a first transistor provided with a control terminal connected to the scan line, a first terminal connected to the data line, and a second terminal connected to a control terminal of a second transistor;
        the second transistor provided with a first terminal connected to a second terminal of a third transistor and a second terminal connected to a first pole of the organic light-emitting diode;
        the third transistor provided with a first terminal connected to a first power supply, wherein the protection module is connected to the control terminal of the first transistor or a control terminal of the third transistor, and the protection module indirectly controls the second transistor to cut off the power supply of the organic light-emitting diode by controlling the first transistor, or controls the third transistor to cut off the power supply of the organic light-emitting diode;
        an AND gate circuit comprising a first input terminal connected to the scan line, a second input terminal connected to the protection module and an output terminal connected to the control terminal of the first transistor through a first node; and
        a first NOT gate circuit connected to the first node and the control terminal of the third transistor,
    wherein the protection module controls the second transistor to cut off the power supply of the organic light-emitting diode by controlling the AND gate circuit to output a low-level signal.

2. The organic light-emitting diode control circuit according to claim 1, wherein the AND gate circuit further comprises a third input terminal connected to a control line for outputting the low-level signal.

3. The organic light-emitting diode control circuit according to claim 1, wherein the protection module comprises:
    a comparison unit comprising a non-inverting input terminal connected to a third node, an inverting input terminal connected to a second power supply, an output terminal, a positive power input terminal connected to the first power supply, and a negative power input terminal connected to a second pole of the organic light-emitting diode; and
    a second NOT gate circuit connected to the output terminal of the comparison unit and the second input terminal of the AND gate circuit,
    wherein the first terminal of the second transistor is connected to the first pole of the organic light-emitting diode through the third node.

4. The organic light-emitting diode control circuit according to claim 3, wherein the comparison unit comprises a voltage comparator or an operational amplifier.

5. The organic light-emitting diode control circuit according to claim 3, wherein the organic light-emitting diode control circuit further comprises a resistor connected to the first pole of the organic light-emitting diode and the third node.

6. The organic light-emitting diode control circuit according to claim 3, wherein the second NOT gate circuit comprises a fourth transistor and a fifth transistor, wherein a control terminal of the fifth transistor and a control terminal of the fourth transistor are connected to the output terminal of the comparison unit, a first terminal of the fifth transistor and a first terminal of the fourth transistor are connected to the second input terminal of the AND gate circuit, a second terminal of the fourth transistor is connected to the second pole of the organic light-emitting diode, and a second terminal of the fifth transistor is connected to a third power supply.

7. The organic light-emitting diode control circuit according to claim 6, wherein the fourth transistor is an N-type metal oxide semiconductor field effect transistor, and the fifth transistor is a P-type metal oxide semiconductor field effect transistor.

8. The organic light-emitting diode control circuit according to claim 1, wherein the organic light-emitting diode control circuit further comprises a precharge capacitor, the first terminal of the first transistor and the control terminal of the second transistor are connected through a second node, and the precharge capacitor is connected to the second node and a second pole of the organic light-emitting diode.

9. A display panel comprising:
 a base substrate; and
 an organic light-emitting diode control circuit formed on the base substrate, comprising:
  an organic light-emitting diode;
  an input control module connected to a scan line, a data line and the organic light-emitting diode, wherein the input control module is enabled in response to a scan signal provided by the scan line, and the input control module controls an operation of the organic light-emitting diode based on a data signal provided by the data line; and
  a protection module connected to the organic light-emitting diode and the input control module, wherein the protection module is able to detect a current passing through the organic light-emitting diode or a voltage across the organic light-emitting diode, and controls the input control module to cut off power supply of the organic light-emitting diode when the current of the organic light-emitting diode or the voltage across the organic light-emitting diode is greater than a preset value;
 wherein the input control module comprises:
  a first transistor provided with a control terminal connected to the scan line, a first terminal connected to the data line, and a second terminal connected to a control terminal of a second transistor;
  the second transistor provided with a first terminal connected to a second terminal of a third transistor and a second terminal connected to a first pole of the organic light-emitting diode;
  the third transistor provided with a first terminal connected to a first power supply, wherein the protection module is connected to the control terminal of the first transistor or a control terminal of the third transistor, and the protection module indirectly controls the second transistor to cut off the power supply of the organic light-emitting diode by controlling the first transistor, or controls the third transistor to cut off the power supply of the organic light-emitting diode;
  an AND gate circuit comprising a first input terminal connected to the scan line, a second input terminal connected to the protection module and an output terminal connected to the control terminal of the first transistor through a first node; and
  a first NOT gate circuit connected to the first node and the control terminal of the third transistor,
 wherein the protection module controls the second transistor to cut off the power supply of the organic light-emitting diode by controlling the AND gate circuit to output a low-level signal.

10. The display panel according to claim 9, wherein the AND gate circuit further comprises a third input terminal connected to a control line for outputting the low-level signal.

11. The display panel according to claim 9, wherein the protection module comprises:
 a comparison unit comprising a non-inverting input terminal connected to a third node, an inverting input terminal connected to a second power supply, an output terminal, a positive power input terminal connected to the first power supply, and a negative power input terminal connected to a second pole of the organic light-emitting diode; and
 a second NOT gate circuit connected to the output terminal of the comparison unit and the second input terminal of the AND gate circuit,
 wherein the first terminal of the second transistor is connected to the first pole of the organic light-emitting diode through the third node.

12. The display panel according to claim 11, wherein the comparison unit comprises a voltage comparator or an operational amplifier.

13. The display panel according to claim 11, wherein the organic light-emitting diode control circuit further comprises a resistor connected to the first pole of the organic light-emitting diode and the third node.

14. The display panel according to claim 11, wherein the second NOT gate circuit comprises a fourth transistor and a fifth transistor, wherein a control terminal of the fifth transistor and a control terminal of the fourth transistor are connected to the output terminal of the comparison unit, a first terminal of the fifth transistor and a first terminal of the fourth transistor are connected to the second input terminal of the AND gate circuit, a second terminal of the fourth transistor is connected to the second pole of the organic light-emitting diode, and a second terminal of the fifth transistor is connected to a third power supply.

15. The display panel according to claim 14, wherein the fourth transistor is an N-type metal oxide semiconductor field effect transistor, and the fifth transistor is a P-type metal oxide semiconductor field effect transistor.

16. The display panel according to claim 9, wherein the organic light-emitting diode control circuit further comprises a precharge capacitor, the first terminal of the first transistor and the control terminal of the second transistor are connected through a second node, and the precharge capacitor is connected to the second node and a second pole of the organic light-emitting diode.

* * * * *